US012336940B2

(12) United States Patent
Cardona

(10) Patent No.: US 12,336,940 B2
(45) Date of Patent: *Jun. 24, 2025

(54) MOBILITY DEVICE SECUREMENT SYSTEM

(71) Applicant: Valeda Company, LLC, Oakland Park, FL (US)

(72) Inventor: Edgardo Cardona, Pompano Beach, FL (US)

(73) Assignee: Valeda Company, LLC, Oakland Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,769

(22) Filed: Nov. 20, 2023

(65) Prior Publication Data

US 2024/0082080 A1 Mar. 14, 2024

Related U.S. Application Data

(63) Continuation of application No. 16/991,153, filed on Aug. 12, 2020, now Pat. No. 11,819,462.

(60) Provisional application No. 62/885,428, filed on Aug. 12, 2019, provisional application No. 62/885,481, filed on Aug. 12, 2019.

(51) Int. Cl.
*A61G 3/08* (2006.01)

(52) U.S. Cl.
CPC .................................. *A61G 3/0808* (2013.01)

(58) Field of Classification Search
CPC .................................................... A61G 3/0808
USPC ...................................................... 296/65.04
See application file for complete search history.

(56) References Cited

U.S. PATENT DOCUMENTS

| | | | |
|---|---|---|---|
| 6,231,283 B1 | 5/2001 | Stowers |
| 7,425,110 B2 | 9/2008 | Ditch |
| 7,854,576 B2 | 12/2010 | Girardin et al. |
| 10,688,959 B2 | 6/2020 | Bryant |
| 11,819,462 B2 | 11/2023 | Cardona |
| 2006/0159542 A1 | 7/2006 | Ditch |
| 2010/0086375 A1 | 4/2010 | Tremblay et al. |

FOREIGN PATENT DOCUMENTS

KR 20160092112 A 8/2016

OTHER PUBLICATIONS

Communication dated Oct. 22, 2020 in PCT/US2020/045839.
Communication dated Dec. 14, 2020 in PCT/US2020/045839 (Written Opinion and International Search Report).

*Primary Examiner* — Joseph D. Pape
(74) *Attorney, Agent, or Firm* — Daniel Tallitsch; Tyler Schultz

(57) ABSTRACT

The embodiments described and claimed herein include an automated securement system that secures a wheeled mobility device for transit in a vehicle, and periodically re-secures the wheelchair to ensure proper securement despite shifting of the wheelchair during transit. The embodiments also include improvements to a compression-based wheeled mobility device securement system.

20 Claims, 13 Drawing Sheets

MOBILITY DEVICE SECUREMENT SYSTEM

CROSS REFERENCE TO OTHER APPLICATIONS

This application claims priority to U.S. patent application Ser. No. 16/991,153, filed on Aug. 12, 2020, which claims priority to U.S. Provisional Patent Application Nos. 62/885,428, filed on Aug. 12, 2019, and 62/885,481, filed on Aug. 12, 2019, the contents of which are incorporated herein by reference.

U.S. Pat. Nos. 10,350,120 and 10,071,004, U.S. Patent Application No. 62/825,325 and Ser. No. 15/605,872, and U.S. Patent Publication No. US2017-0128290A1 are all incorporated herein by reference.

FIELD OF THE DISCLOSURE

The embodiments described and claimed herein relate generally to securement systems that are configured to secure wheeled mobility devices in vehicles using a bumper, including but not limited to systems comprising multiple bumpers that restrain the wheelchair mobility device during transit through the use of compression.

BACKGROUND

There are 2.2 million wheeled mobility device ("WMD") users in America today. Many users remain in their WMD (e.g., wheelchairs, scooters, etc.) while boarding and riding private or mass transportation vehicles. Systems have been developed and employed to secure WMDs and WMD-bound occupants (referred to herein as mobility passengers). These systems are typically comprised of occupant restraints that include at least one shoulder belt along with one or more lap belts. They may also include some form of WMD securement that could comprise one or more tie-downs (e.g., belts), bumpers, barriers, latches and/or automated grippers. Although these systems have proven successful in meeting occupant stability needs and basic crash test requirements, they are typically cumbersome and time consuming to apply. In addition, most of these systems (e.g., tie-down based systems) do not provide the mobility passenger with sufficient independence, such as the ability to secure themselves and their WMD without the assistance of the vehicle driver.

Accordingly, Q'Straint has developed a rear-facing compression-based system, the Quantum, which gives complete independence to mobility passengers. The Quantum enables mobility passengers to secure themselves with the push of a button, and without requiring driver assistance. The Quantum system primarily comprises a backrest and two bumpers, in the form of arms located at opposite sides of the backrest. To use the Quantum, the mobility passenger centers their wheelchair or scooter against the backrest and engages an automatic locking sequence by pressing an ADA-friendly button. Quantum's arms deploy and engage with the WMD on opposite side surfaces by compression to safely secure the wheelchair in place. The arms adjust their grip as needed (i.e., apply additional squeezing force), in response to mechanical pressure sensors that detect the level of force or compression applied to the WMD. Once the vehicle stops at the mobility passenger's destination, the button is pressed again so that they can disembark.

SUMMARY OF THE EMBODIMENTS

The inventions described herein comprise improvements to the Q'Straint Quantum system, but also can be incorporated into other securement systems that utilize one or more moveable bumpers (for example, one or more moveable bumpers incorporated into a 3-point or 2-point or 1-point tie-down system, see U.S. Pat. Nos. 10,350,120 and 10,071,004 and U.S. Patent Publication No. US2017-0128290A1, which are all incorporated herein by reference) or any securement system that secures a WMD through the use of compression.

Other embodiments, which include some combination of the features discussed above and below, and other features which are known in the art, are contemplated as falling within the claims even if such embodiments are not specifically identified and discussed herein.

Figure 1:
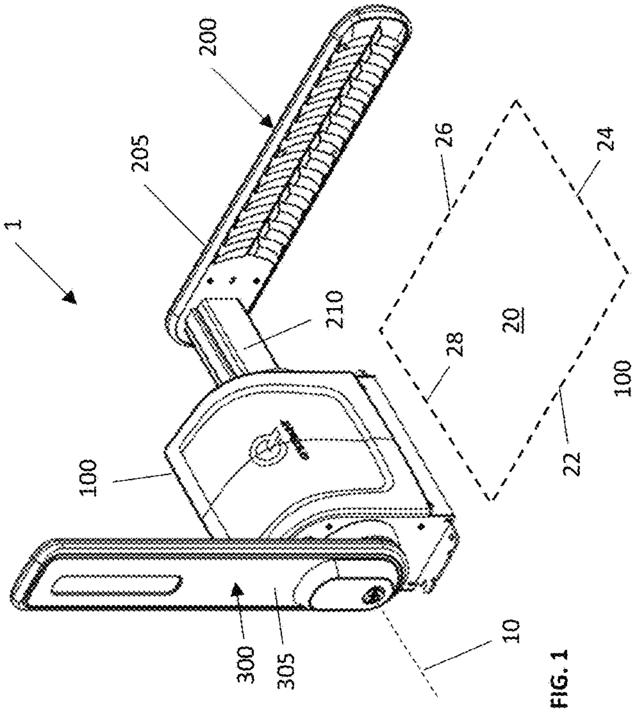
FIG. 1 is a first perspective view of a first embodiment of a wheeled mobility device securement system, shown in a stow position with the aisle side bumper up and retracted and the wall side bumper extended.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE EMBODIMENTS

FIGS. 1-4 show a first embodiment of a wheeled mobility device securement system 1 for securing a wheeled mobility device in a vehicle. The system 1, or components thereof, may be used in a vehicle as shown (bolted to a surface, such as the floor), or may be incorporated or integrated into other components or modules of a vehicle, such as walls or seat bases. Additionally, the system 1 could be combined with various other securement components, such as a backrest, occupant restraints, wheeled mobility device tie-downs, additional bumpers, and/or other supplemental securement systems (airbags, etc.).

The system 1 may, as shown, comprise a body assembly 100 holding a first bumper 200 and a second bumper 300. The bumpers 200, 300 may, as shown, define arms 205, 305 that extend from arm tubes 210, 320 (or telescoping members). The arm tubes 210, 310 may be configured (as discussed in more detail below) to extend from and retract into the body assembly 100 (i.e., move in both directions along a lateral axis 10). In addition, one or more of the arm tubes, in this case arm tube 310, is configured to rotate about the lateral axis 10. In a typical embodiment, both bumpers 200, 300 will be moveable in both directions along a lateral axis 10, but only one will be a rotating bumper (in this case, bumper 300) and one will be a non-rotating bumper (in this case, bumper 200). However, in some embodiments, both bumpers may be rotating or both may be non-rotating. Although the bumpers 200, 300 are configured to move linearly along lateral axis 10, other embodiments need not move linearly. See, for example, U.S. Provisional Patent Application No. 62/825,325, which is incorporated herein by reference.

The embodiment shown in FIGS. 1-4 may be configured to secure a wheeled mobility device in either: (1) a rear-facing configuration with the first bumper 200 disposed adjacent to a right-side vehicle wall and the second bumper 300 located adjacent an aisle of the vehicle; (2) a forward-facing configuration with the first bumper 200 located adjacent a left-side vehicle wall and the second bumper 300 located adjacent a vehicle aisle; or (3) a side-facing configuration with the body assembly 100 adjacent a vehicle wall and the first bumper 200 adjacent a modesty barrier. Other configurations are contemplated and possible by modifying the structure and function of first and second bumpers 200, 300. For example, to facilitate a rear-facing configuration with the system located between a left-side vehicle wall and vehicle aisle, a mirror image of the system 1 could be used (e.g., wherein a non-rotating bumper could be used in place of bumper 300 and a rotating bumper could be used in place of bumper 200).

In FIG. 1, the system 1 is shown in a stow position with the first bumper 200 down and extended (away from the body assembly 100, and adjacent a vehicle wall) and the second bumper 300 up and retracted (adjacent to the body assembly 100 and away from the vehicle aisle). The second bumper 300, being positioned in both the up and retracted position, reduces a tripping hazard that may otherwise be present due to the system 1 extending into the vehicle aisle. In the stow position, the system 1 is ready to receive a wheeled mobility device in the wheelchair securement area 20. In particular, a wheelchair passenger can back their wheeled mobility device into the wheelchair securement area 20 and toward the body assembly 100 (whereby the seatback of the wheeled mobility device will be adjacent or touching a backrest extending upward from the body assembly 100, if present). Access into the wheelchair securement area 20 from the aisle of the vehicle is made easy by keeping the second bumper 300 in the up position.

Figure 2:
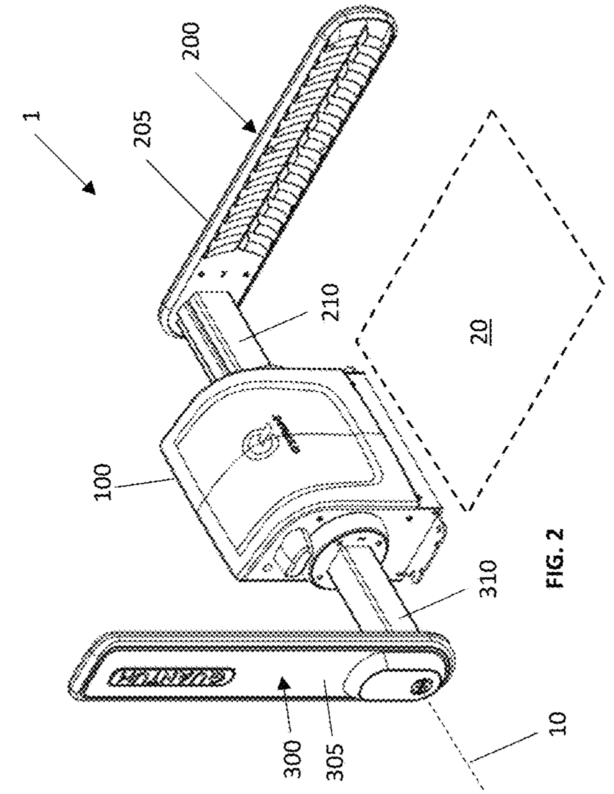
FIG. 2 is a second perspective view of the first embodiment, shown in a deploy position with the aisle side bumper up and both bumpers extended.
Figure 3:
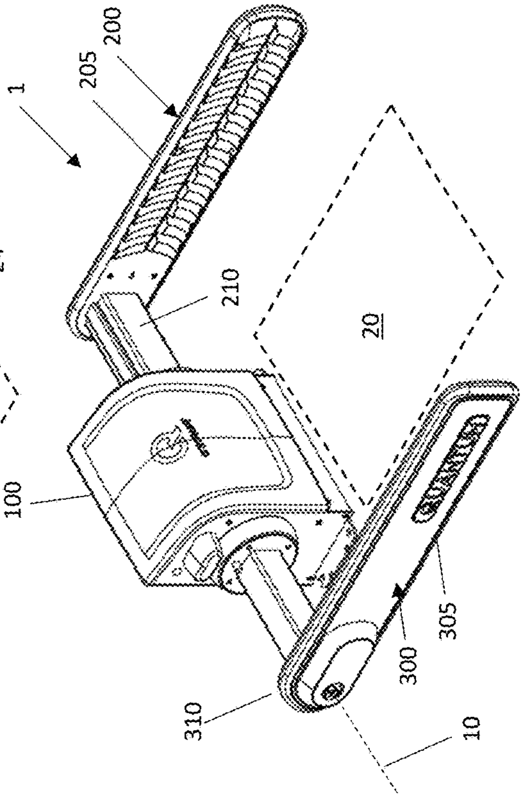
FIG. 3 is a third perspective view of the first embodiment, shown in an engage position with the aisle side bumper down and both bumpers extended.

In FIG. 2, the system 1 is shown in a deploy position, whereby the second bumper 300 has moved outward from the body assembly 100. In FIG. 3, the system is shown in an engage position, whereby the second bumper 300 is rotated downward where it may be generally parallel with the first bumper 200, after which the first and second bumper 200, 300 each begin to move toward each other until both of the bumpers 200, 300 engage with the wheeled mobility device. Because each bumper 200, 300 is capable of continuing to move even after the other bumper 200, 300 has contacted the side of the wheeled mobility device, the system 1 is capable of securing a wheeled mobility device that is located off center in the wheelchair securement area 20.

Figure 4:
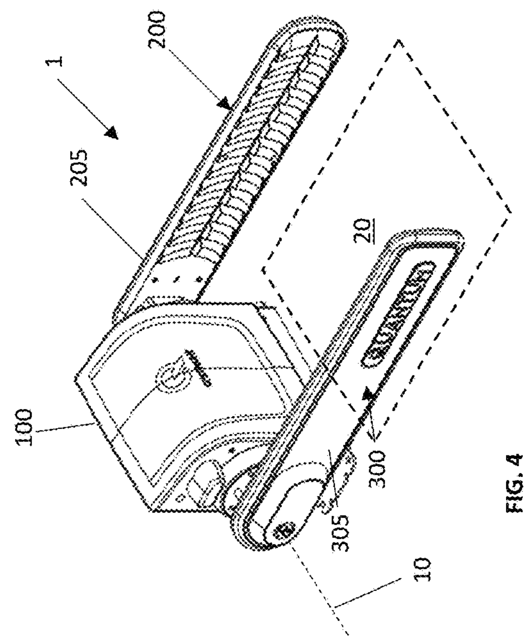
FIG. 4 is a fourth perspective view of the first embodiment, shown in a secure position with the aisle side bumper down and both bumpers retracted.

In FIG. 4, the system 1 is shown in a wheelchair secure position, whereby the first and second bumper 200, 300 are intended to be engaged with opposite sides of the wheeled mobility device and are applying a compressive, securing force on the wheeled mobility device. As discussed in more detail below, the system 1 is configured to periodically confirm that sufficient compressive force is applied to the wheeled mobility device, and to apply additional force as needed.

Figure 5:
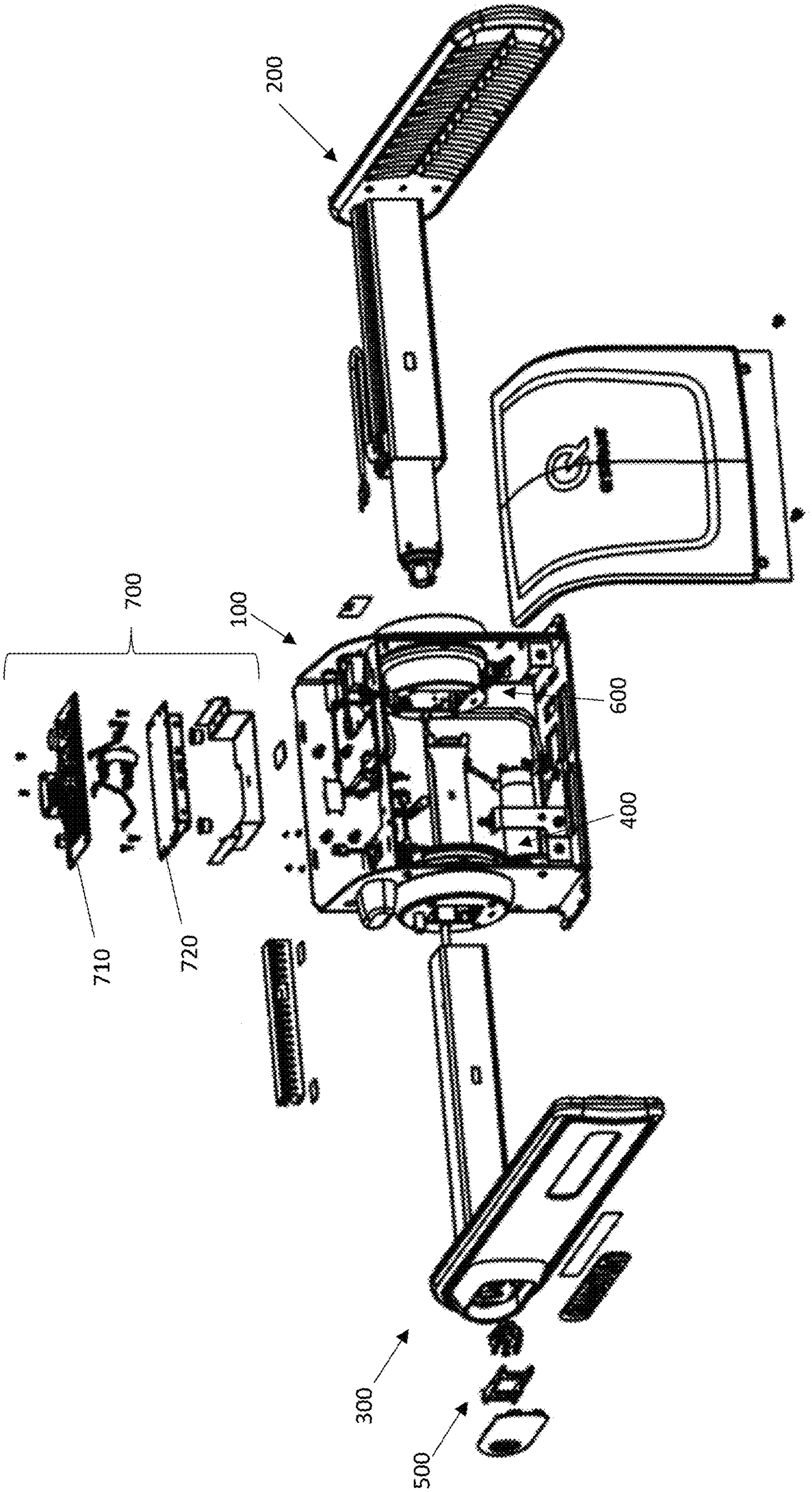
FIG. 5 is a fifth perspective view of the first embodiment, shown partially exploded.

In FIG. 5, the system 1 is shown partially exploded into various sub-assemblies, including the body assembly 100 (which holds a rotation motor assembly 400 for the second bumper 300 and the static collar assembly 600 for the first bumper 200), the first bumper 200 (i.e., a "static" or "non-rotating" arm or bumper), the second bumper 300 (i.e., a "rotating" arm or bumper), a release handle assembly 500, and a controller assembly 700.

Figure 6:
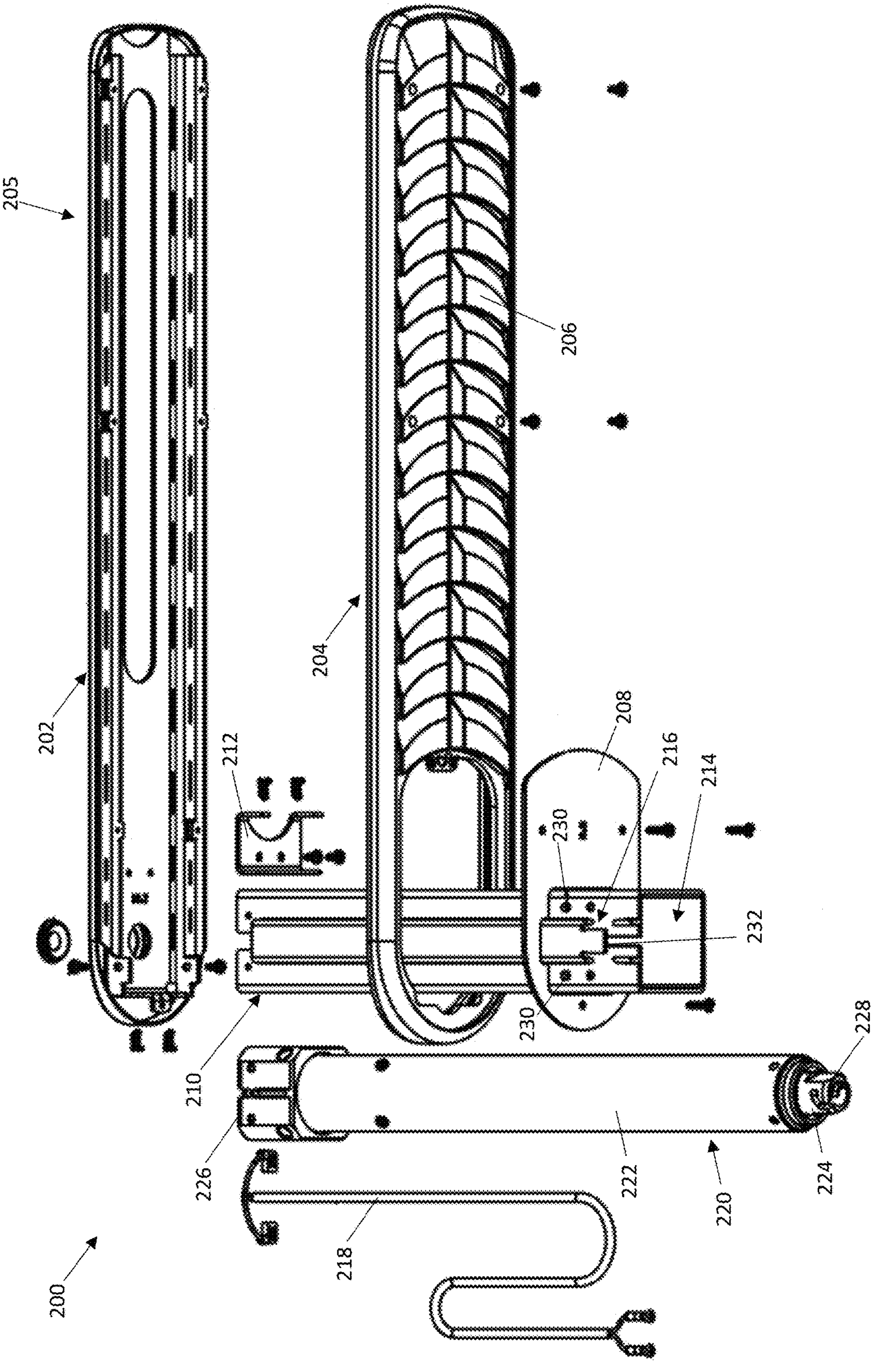
FIG. 6 is a perspective view of a non-rotating bumper assembly, shown partially exploded.

The first bumper 200 is shown in greater detail in FIG. 6. The bumper 200 is generally comprised of an arm 205, an arm tube 210, and a linear drive 220. The arm 205 is generally comprised of a structural member 202, a gripper assembly 204, a cover plate 208 that are configured to interconnect with a plurality of fasteners. The gripper assembly 204 includes a grip pad or gripping surface 206 for engagement with a surface of the wheeled mobility device. The gripping surface 206 may be a resilient, high friction surface and may be inflatable and/or include moveable fingers or other structures to enhance grip on the wheeled mobility device. The arm 205 is connected to the arm tube 210 using a plurality of fasteners and angle brace 212 to provide additional structural rigidity. The first bumper 200 may include various lights or speakers to warn vehicle occupants that the bumper 200 is moving, or of imminent movement. Lights and speakers may also be provided on other components of the system 1, including the body assembly 100 and the second bumper 300. The arm tube 210 includes a first channel 214 extending from one end of the arm 210 to the other for receiving the linear drive 220. The arm tube 210 may include a second channel 216 along at least a portion of its length for receiving a linear drive power assembly 218 (which could be an electrical wiring harness or hydraulic or pneumatic tubes). The linear drive 220 as shown is an electrical motor and gear-driven linear actuator with a cylinder 222 holding a piston 224. The piston 224 telescopes with the cylinder 222 to change the length of the linear drive 220 as measured from the base 226 of the cylinder 222 to the end 228 of the piston 224. Although shown as a motor and gear-driven linear actuator, it is contemplated that the linear drive 220 could alternatively be hydraulically or pneumatically driven. As discussed in more detail below, the base 226 of the linear drive 220 is secured to the first bumper 200, while the end 228 of the linear drive 220 is secured to the second bumper 300. Extending the piston 224 from the cylinder 222 causes the linear drive 220 to lengthen and thus causes the first bumper 200 and the second bumper 300 to move away from each other (e.g., to release a wheeled mobility device from securement). Retracting the piston 224 into the cylinder 222 causes the linear drive 220 to shorten and thus causes the first bumper 200 and the second bumper 300 to move toward each other or to compress and secure the wheeled mobility device. The first bumper 200 may include one or more magnets 230, for instance located along the length of the arm tube 210. The magnets 230 may be positioned to be picked up by one or more magnetic proximity sensors for detecting the lateral position of the first bumper 200 (e.g., how far the bumper 200 is extended or retracted into the main body 100). In this case, a first proximity sensor 112 is located in the body assembly 100 (see FIGS. 13-14) for detecting magnet 230 when the first bumper 200 is fully extended.

Figure 7:
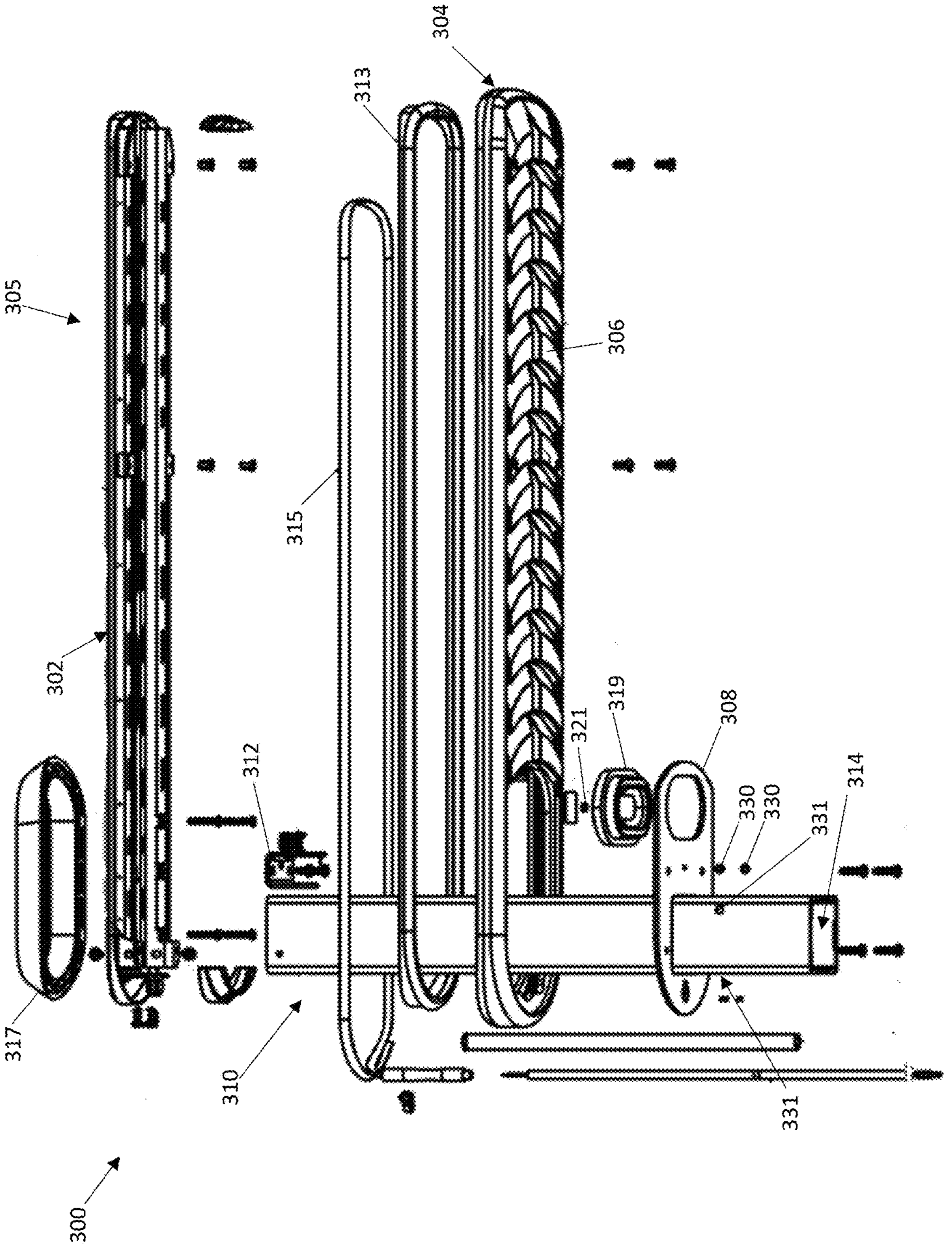
FIG. 7 is a perspective view of a rotating bumper assembly, shown partially exploded.
Figure 9:
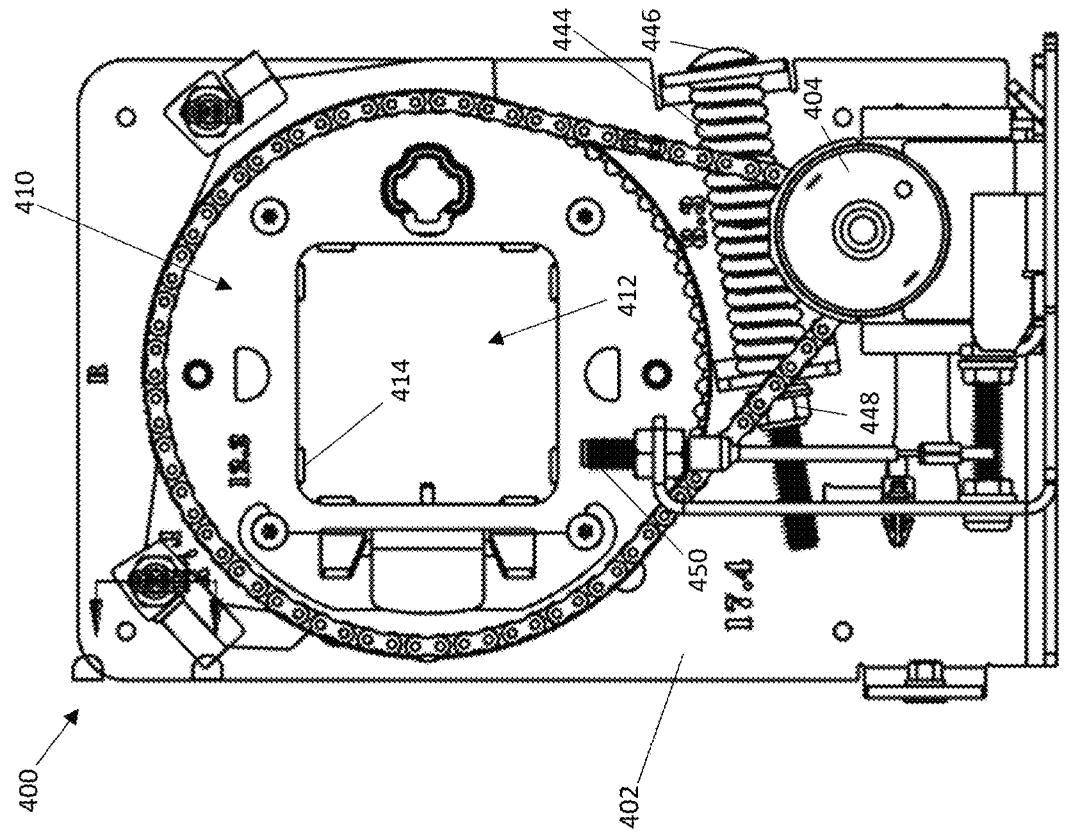
FIG. 9 is a side view of the rotation motor assembly.
Figure 8:
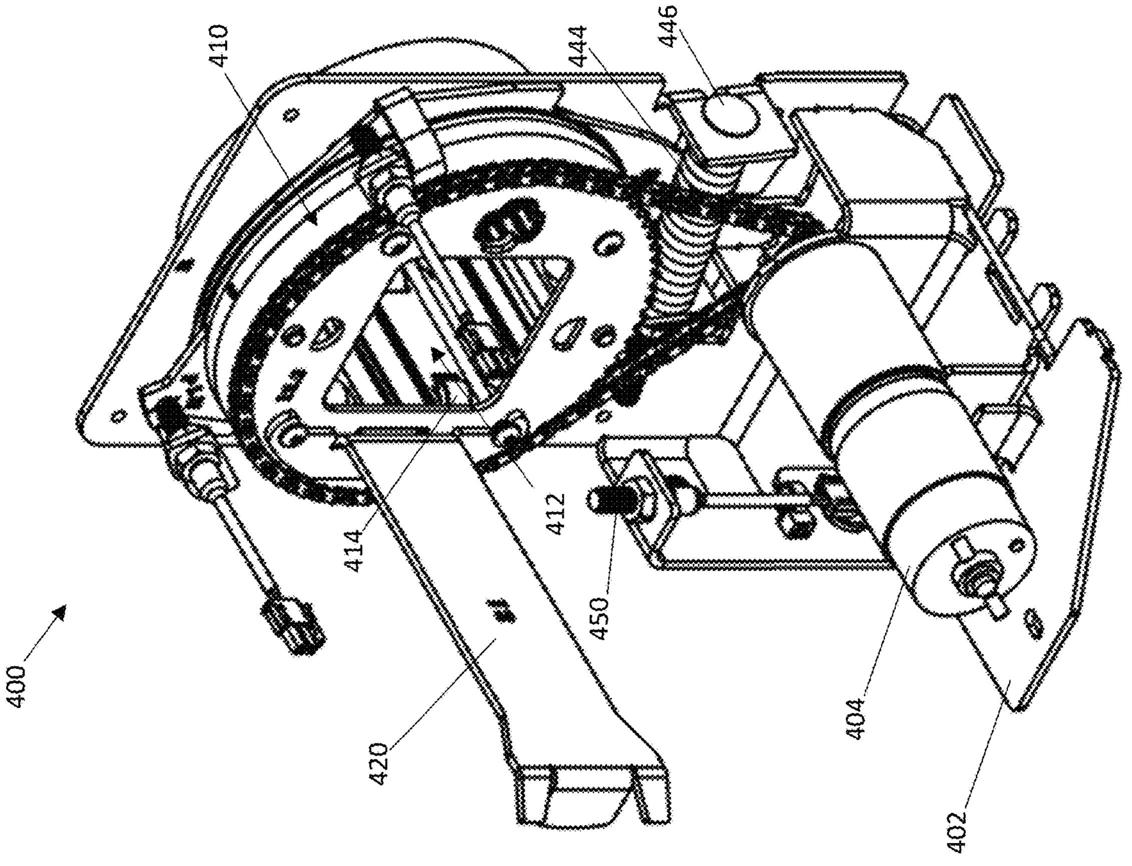
FIG. 8 is a first perspective view of a rotation motor assembly.
Figure 10:
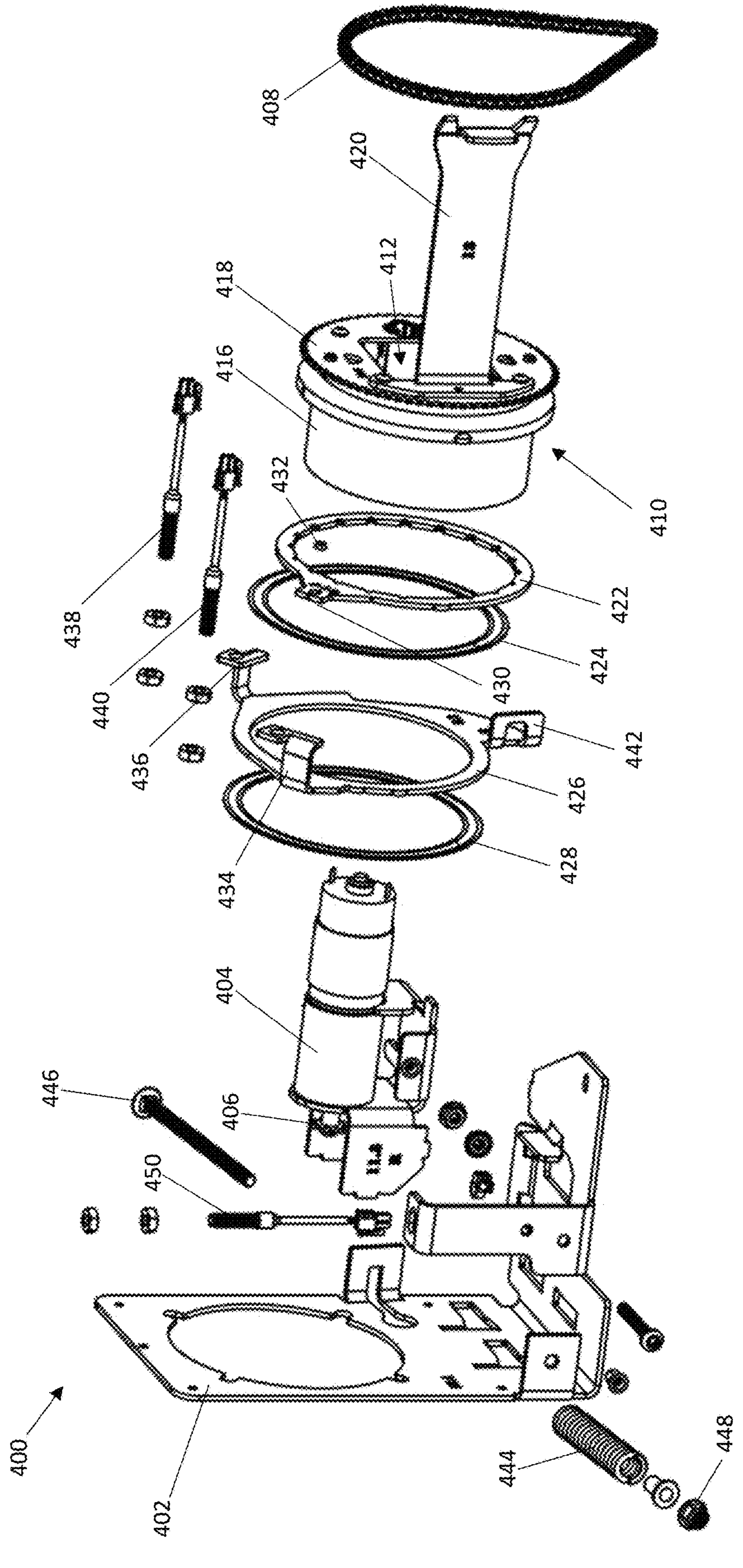
FIG. 10 is a second perspective view of the rotation motor assembly, shown partially exploded.
Figure 11:
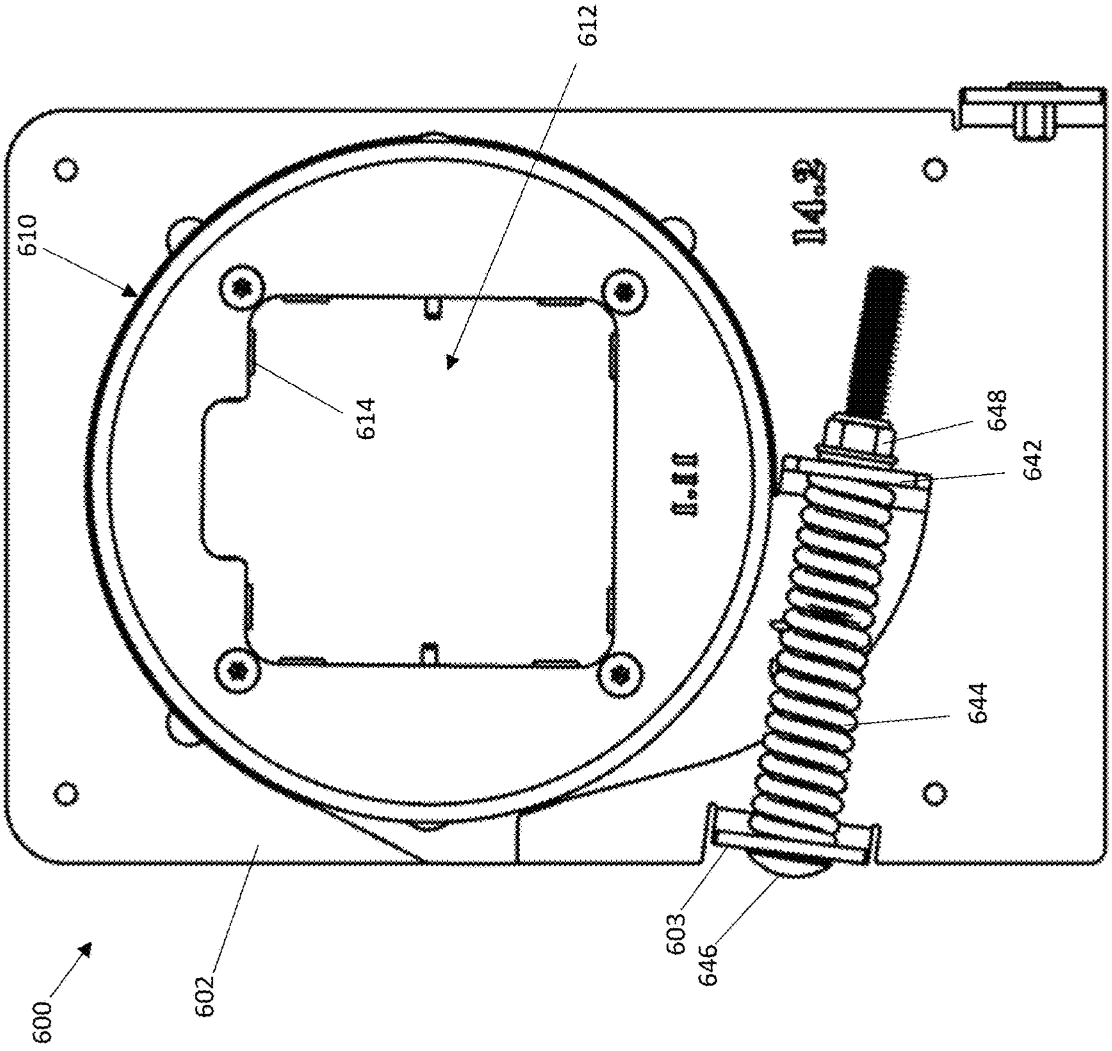
FIG. 11 is a side view of the static collar assembly.
Figure 12:
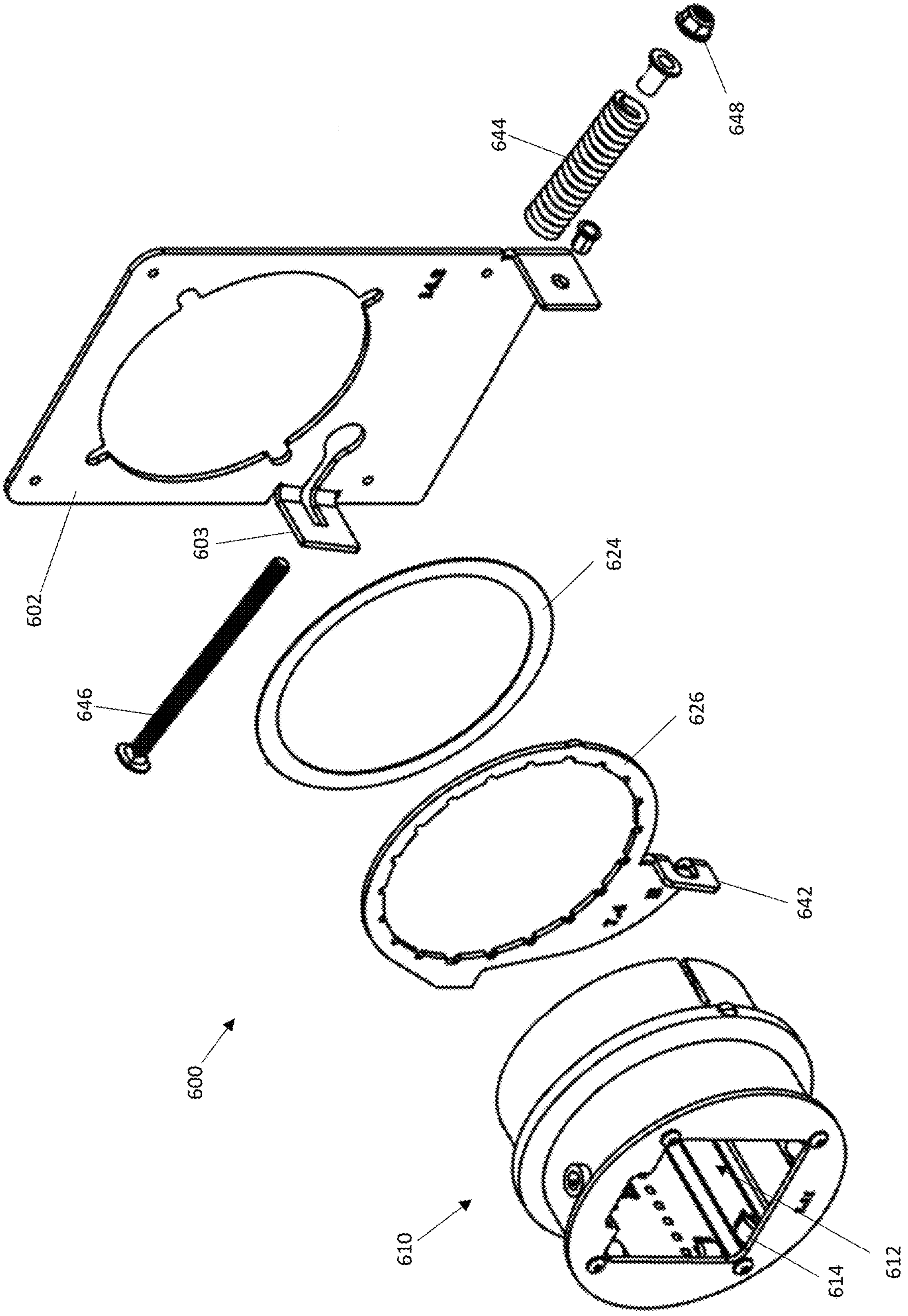
FIG. 12 is a perspective view of the static collar assembly, shown partially exploded.

The second bumper 300 is shown in greater detail in FIG. 7. The bumper 300 is generally comprised of an arm 305 and an arm tube 310. The arm 305 is generally comprised of a structural member 302, a gripper assembly 304, and a cover plate 308 that are configured to interconnect with a plurality of fasteners. Like the gripper assembly 204 for the first bumper 200, the gripper assembly 304 includes a grip pad or gripping surface 306 for engagement with a surface of the wheeled mobility device. The arm 305 is connected to the arm tube 310 using a plurality of fasteners and an angle brace 312 to provide additional structural rigidity. The second bumper 300 may include various lights or speakers to warn vehicle occupants that the bumper 300 is moving, or of imminent movement. In the embodiment of FIG. 7, the bumper 300 includes an oval-shaped LED light 313 and associated power harness 315 are provided (although any shape and number of lights may be used). The bumper 300 further includes a bezel 317 on one side and a docking bumper 319 on the other side. The docking bumper 319 is soft and resilient, may be constructed of a rubber-type material, and is designed to engage and nest with brake nub 114 on the side of the body assembly 100 when the bumper 300 is in the fully retracted position (see FIG. 1). A magnet 321 is provided adjacent the docking bumper 319 for pickup by the sixth proximity sensor 116. When the magnet 321 is in pickup range by the sixth proximity sensor 116, the controller for the system 1 knows that the second bumper is both up and fully retracted (as shown in FIG. 1). The arm tube 310 has a cross-section that corresponds to and is slightly smaller than the cross-section of the arm tube 210 of the first bumper 200, whereby the arm tube 310 can be received inside of the arm tube 210. In this case, both arm tubes 210, 310 have a square cross-section and are designed to telescope. In that respect, the non-rotating bumper 200, which is designed to not rotate, can prevent the rotating bumper 300 from rotating when the arm tubes 210, 310 are telescopingly engaged. Rotation of the bumper 300 is permitted, however, when the bumpers 200, 300 are sufficiently extended out of the body assembly 100, whereby the arm tubes 210, 310 disengage from telescoping engagement. The arm tube 310 includes a channel 314 extending from one end of the arm 210, and has dimensions slightly larger than and can receive the linear drive 220 (both the cylinder 222 and the piston 224). The piston 224 is configured to extend through the channel 314, and the end 228 of the piston 228 is configured to engage with the release handle assembly 500 to lock the bumpers 200, 300 together. As discussed in more detail below, the release handle assembly 500 can be used to disengage the bumpers 200, 300, whereby the bumpers 200, 300 can be moved by hand in an emergency to release a secured wheeled mobility device. The second bumper 300 may include one or more magnets 330, for instance located around the radius or on various sides of the arm tube 310, or along the length of the arm tube 310. In this case, there are two magnets 330, one each in corresponding apertures 331 on respective sides of the arm tube 310 that are offset from each other by approximately 90°. The magnets 330 may be positioned to be picked up by one or more magnetic proximity sensors located in the body assembly 100 for detecting the rotational or lateral position of the first bumper 300 (e.g., whether the bumper 300 is up or down and/or how far the bumper 300 is extended or retracted into the main body 100). In this case, a fourth proximity sensor 450 is located in the body assembly 100 (on the rotation motor assembly 400, see FIGS. 8-10) for detecting magnets 330 when the second bumper 300 is fully extended (because there are two magnets 300 that are offset by 90°, the fourth proximity sensor 450 can detect full extension when the bumper 300 is both up and down).

Figure 13:
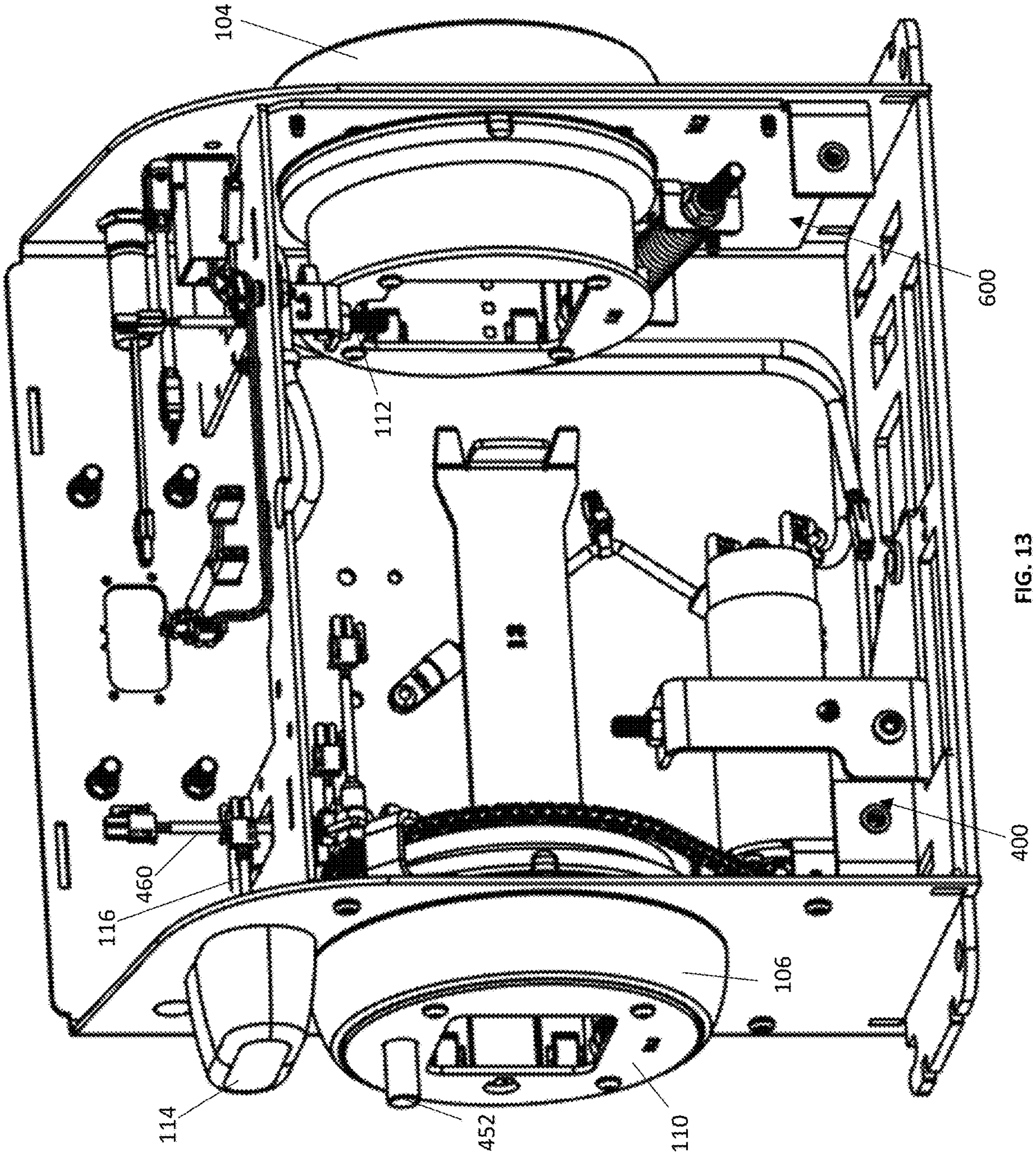
FIG. 13 is a first perspective view of the body assembly.
Figure 14:
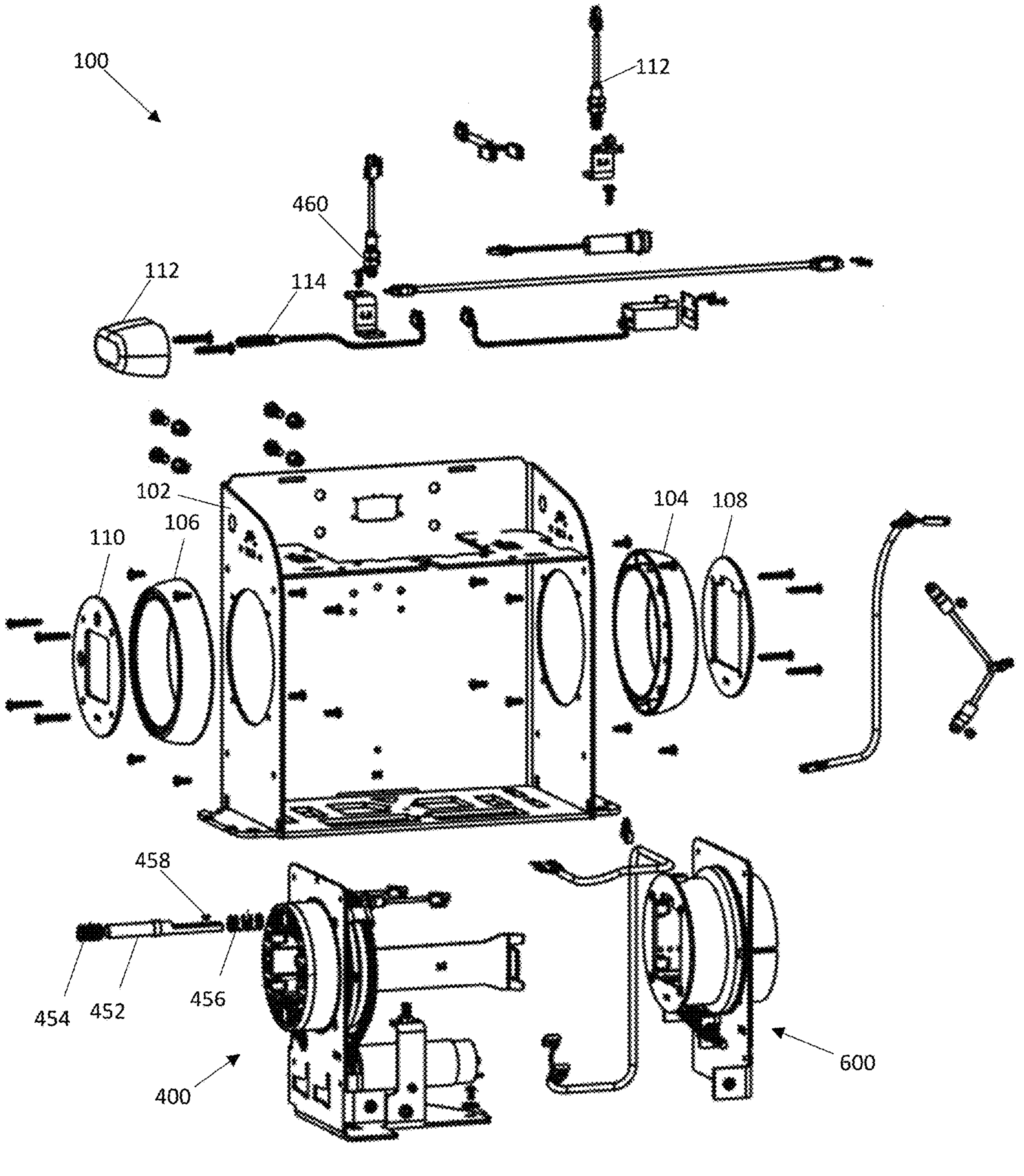
FIG. 14 is a second perspective view of the body assembly, shown partially exploded.

The rotation motor assembly 400 for the second (rotating) bumper 300 is shown in FIGS. 8-10 and 13-14. The rotation motor assembly 400 includes a rotation frame 402 for holding the various components of the assembly, which allows the rotation motor assembly 400 to be assembled outside of the body assembly 100, and thereafter secured in the body assembly 100 as a unit. The rotation frame 402 holds an electric motor 404 and a rotating collar assembly. The electric motor in this case is a 12 Volt DC motor, although AC power and any other suitable voltage may be used. The motor 404 includes a motor sprocket 406, and the rotating collar assembly 410 includes a collar sprocket 418. The motor sprocket 406 is interconnected with the collar sprocket 418 via chain 408. The motor sprocket 406 includes fewer teeth than the collar sprocket 418, whereby the sprockets and chain assembly 406, 418, 408 act as a speed reducer, where the motor shaft rotates at a higher speed than the collar assembly 410 rotates. The rotating collar assembly 410 is provided with an aperture 412 for receiving arm tube 310 therethrough. The aperture 412 has a cross-section corresponding to the cross section of the arm tube 310, in this case square, whereby the second bumper 300 rotates with the collar assembly 410. The inside surface of the aperture 412 may include a plurality of rollers 414 spaced about the periphery of the aperture 412, in this case sixteen rollers 414 (eight around the periphery of the aperture 412 at one end, and eight at the other end), which allow the second bumper 300 to move along the lateral axis 10 freely back and forth. In place of the rollers 414, a low friction sliding surface may be provided. The rotating collar assembly 410 may comprise a rotating collar 416, the rotating collar sprocket 418, and a stow bar 420, which are secured together in the configuration shown using fasteners. In a first position, the stow bar 420 does not impede the extension and retraction of the arm tube 210 in and out of the body assembly 100. However, when rotated 90° clockwise (looking outward from the body assembly 100, i.e., when the bumper 300 is in the up position), the stow bar (or stop member) 420 is positioned in alignment with a portion 232 of the arm tube 210 (in this case, the end of channel 216) to hold the bumper 200 in its fully extended position. In that respect, operation of the linear drive 220 when the stop member 420 is engaged with the portion of the arm tube 210 will cause only the second bumper 300 to extend and retract from the body assembly 100, while the first bumper 200 remains stationary. This permits the configuration shown in FIG. 1, where the first bumper 200 is fully extended from the body assembly and the second bumper 300 is fully retracted into the body. The rotating collar 416 is configured to hold a rotation stopper ring 422, a first bearing ring 424, a buffer plate 426, and a second bearing ring 428, in the order shown in FIG. 10, about its periphery. The rotation stopper ring 422 is configured to rotate with the rotating collar assembly 410, and includes a tab 430 that holds a magnet 432. The buffer plate 426, being disposed between the first and second bearing rings 424, 428, does not rotate with the rotating collar assembly 410, but rather rotates with respect to both the rotating collar assembly 410 and the rotating frame 402. The buffer plate 426 includes a first stop 434 and a second stop 436, each of which acts as a stop for the tab 430. The first stop 434 is configured to engage with the tab 300 (and stop rotation thereof) when the bumper 300 is in the down position, while the second stop 436 is configured to engage with the tab 430 (and stop rotation thereof) when the bumper 300 is in the up position. The first and second stops 434, 436 hold second and third proximity sensors 438, 440, respectively, that sense the magnet 432 located on the tab 430, whereby the controller for the system 1 can be programmed to know when the bumper 300 is appropriately positioned in the up or down position, depending upon which position is desired. For example, when moving the bumper 300 from an up position to a down position, the controller can power the motor 404, and continue to power the motor 404, until the proximity sensor located on the first stop 434 senses the magnet 432. Conversely, when moving the bumper from a down position to an up position, the controller can power the motor 404, and continue to power the motor 404, until the proximity sensor located on the second stop 436 senses the magnet 432. The buffer plate 426 further includes a bracket 442, while the rotation frame 402 includes a corresponding bracket 403. The bracket 442 and corresponding bracket 403 are configured to hold a compression spring 444 therebetween, which is held in place using a bolt 446 and nut 448. The compression spring 444 is therefore configured to allow some rotation of the buffer plate 426 in the counter-clockwise direction (looking outward from the body assembly 100) and thereby buffer, cushion, or dampen any unexpected downward forces that are exerted on the bumper 300, such as a vehicle occupant standing on the bumper when it is located in the down position (which, of course, would push the tab 430 into the first stop 434, thereby rotating the buffer ring 426 and compressing the compression spring 444). The buffer ring 426 is prevented from clockwise rotation (looking outward from the body assembly 100) by virtue of bolt 446 and nut 444 which interconnect the buffer ring 426 with the rotation frame 402. The rotation frame 402 holds a fourth proximity sensor 450, which is position to detect when the second bumper 300 is in the fully extended position. Because the arm tube 310 of the second bumper 300 includes two magnets 330 that are offset by 90°, the proximity sensor can detect when the second bumper 300 is in the fully extended position, both when positioned up (as shown in FIG. 2) and down (as shown in FIG. 3). As best shown in FIG. 14, the rotation motor assembly 400 further includes a strokeout pin 452 with springs 454, 456 biasing the strokeout pin 452 in both directions along lateral axis 10. Strokeout pin 452 holds magnet 458 for pickup by a fifth proximity sensor 460. In its unbiased position, magnet 458 will be located adjacent to (within pickup range of) the fifth proximity sensor 460. When the first bumper 200 is fully retracted into the body assembly 100, the portion 232 of the arm tube 210 will engage with the strokeout pin 452 from inside of the body assembly, which will displace the strokeout pin 452 and magnet 458 outward, putting the magnet 458 outside of the pickup range of the fifth proximity sensor 460. Alternatively, when the second bumper 300 is fully retracted, the arm 305 will engage with the strokeout pin 452 from the outside, displacing the strokeout pint 452 and magnet 458 inward, also putting the magnet 458 outside of the pickup range of the fifth proximity sensor 460. When the magnet 458 is outside of the pickup range of the fifth proximity sensor 460, the controller for the system 1 will then know that one of the first or second bumpers 200, 300 is fully retracted into the body assembly 100, which is indicative of improper securement (no wheeled mobility device in the securement area, or wheeled mobility device is too far off center in the securement area 20, to the left or to the right).

The static collar assembly 600 for the first (non-rotating or static) bumper 200 is shown in FIGS. 11-14. The static collar assembly 600 includes a frame 602 for holding the various components of the assembly, which allows the static collar assembly 600 to be assembled outside of the body assembly 100, and thereafter secured in the body assembly 100 as a unit. The frame 602 holds a static collar 610. The static collar 610 is provided with an aperture 612 for receiving arm tube 210 therethrough. The aperture 612 has a cross-section corresponding to the cross section of the arm tube 210, in this case square, whereby the static collar 610 prevents the first bumper 200 from rotating. The inside surface of the aperture 612 may include a plurality of rollers 614 spaced about the periphery of the aperture 612, in this case sixteen rollers 614 (eight around the periphery of the aperture 612 at one end, and eight at the other end), which allow the first bumper 200 to move along the lateral axis 10 freely back and forth. In place of the rollers 614, a low friction sliding surface may be provided. The static collar 610 is configured to hold a bearing ring 424 and a buffer plate 426 in the order shown in FIG. 10, about its periphery, whereby the buffer plate 626 with rotate with the static collar 610, but will rotate with respect to the frame 602. The buffer plate 626 includes a bracket 642, while the rotation frame 602 includes a corresponding bracket 603. The bracket 642 and corresponding bracket 603 are configured to hold a compression spring 644 therebetween, which is held in place using a bolt 646 and nut 648. The compression spring 644 is therefore configured to allow some rotation of the buffer plate 626 in the clockwise direction (looking outward from the body assembly 100) and thereby buffer, cushion, or dampen any unexpected downward forces that are exerted on the bumper 200, such as a vehicle occupant standing on the bumper when it is located in the down position. The buffer ring 626 (and therefore the bumper 200) is prevented from counter-clockwise rotation (looking outward from the body assembly 100) by virtue of bolt 646 and nut 644 which interconnect the buffer ring 626 with the frame 602.

The body assembly 100 is shown in FIGS. 13-14. The body assembly 100 comprises a main housing 102 for holding the various subassemblies of the system 1, including the first bumper 200, the second bumper 300, the rotation motor assembly 400, the release handle assembly 500, the static collar 600, and the controller assembly 700. The body assembly 100 includes shoulder bezels 104, 106 and plates 108, 110 secured to the sides of the body assembly. The bezels 104, 106 and plates 108, 110 include apertures for receiving the first and second bumpers 200, 300 respectively. The body assembly further includes a brake nub or stop 114 located on the side of the frame 102 for engagement with the bumper 300 when it is located in the up and fully retracted position (see FIG. 1). A sixth proximity sensor 116 is located in the brake nub 114

Figure 15:
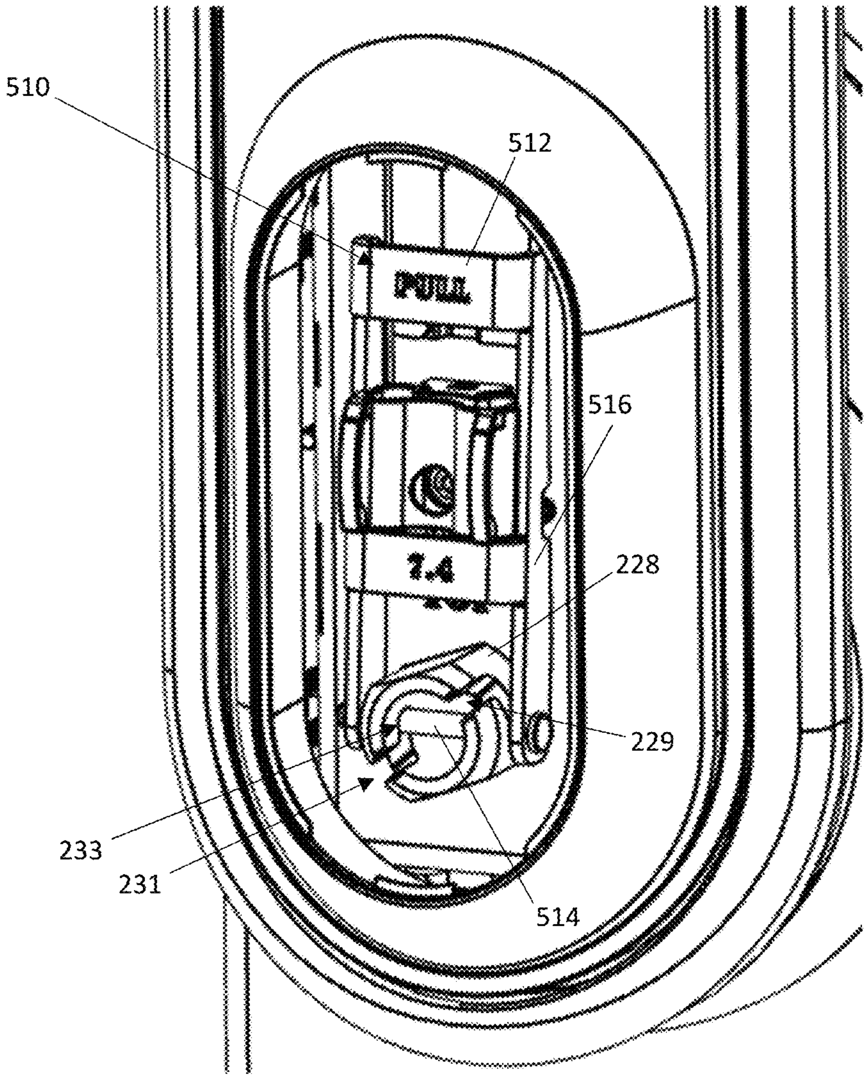
FIG. 15 is a perspective view of the release handle assembly.
Figure 16:
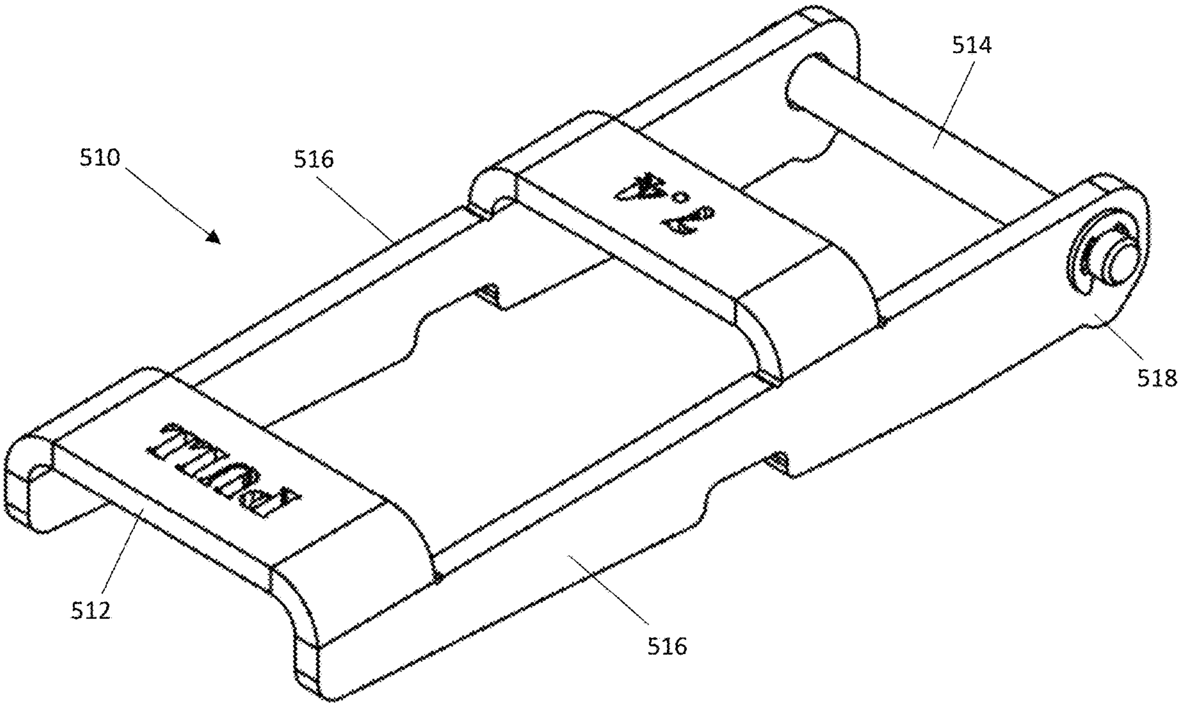
FIG. 16 is a perspective view of the manual release handle.
Figure 17:
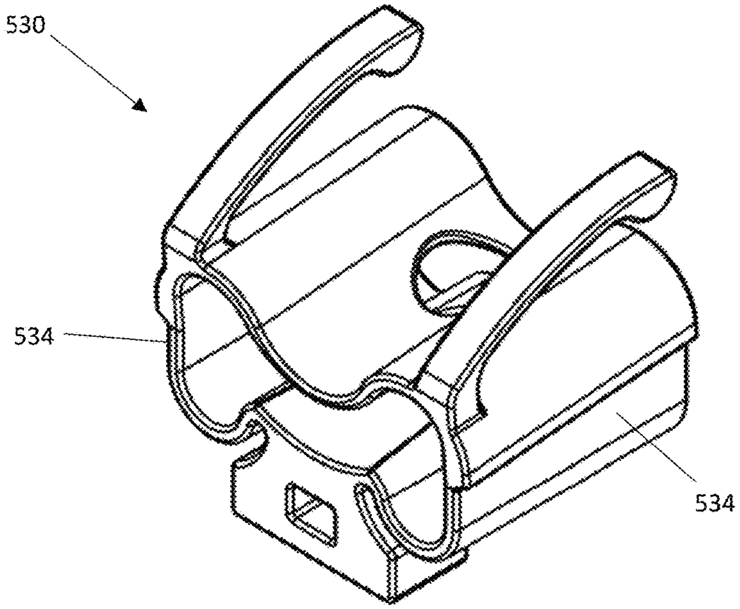
FIG. 17 is a perspective view of the release handle latch.
Figure 18:
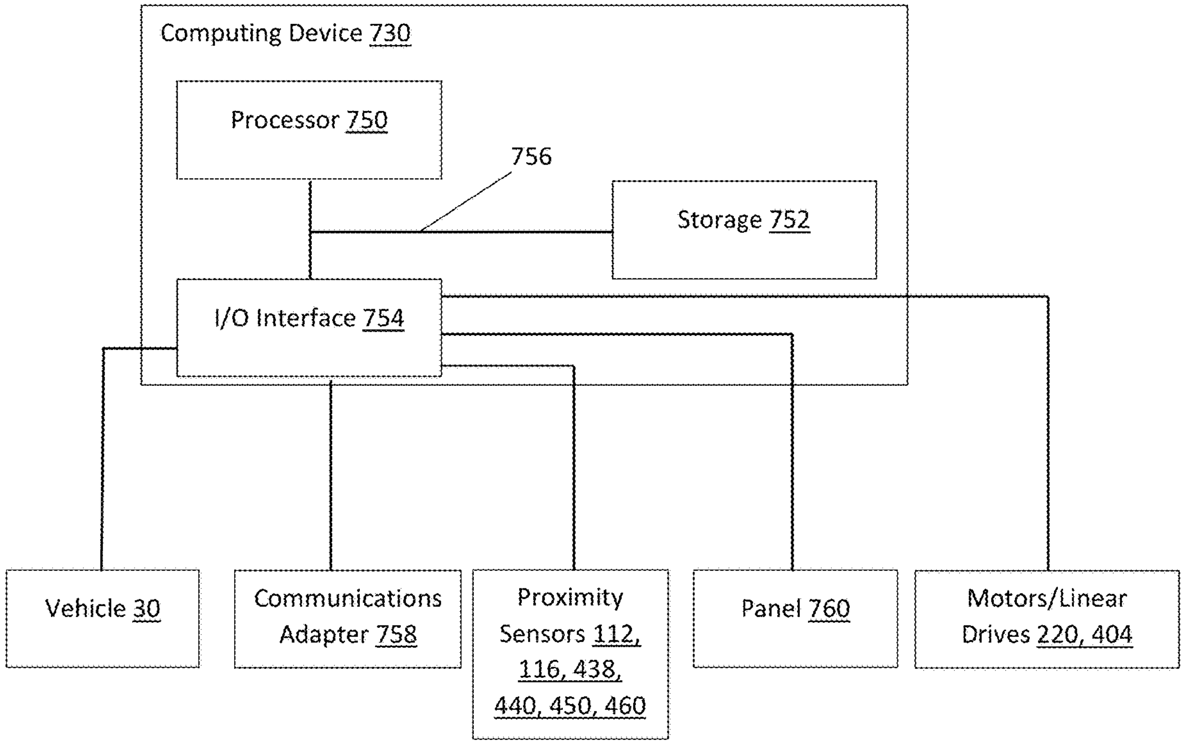
FIG. 18 is an exemplary system controller.

As shown in FIG. 15, the release handle assembly 500 is comprised of manual release handle 510 and release handle latch 530. The release handle latch 530 is secured to the second bumper 300 using a fastener. The manual release handle 510 is configured to couple the end 228 of the piston 224 to the second bumper 300, and the release handle latch 530 holds the manual release handle 510 in a locked position. As best seen in FIG. 16, the manual release handle 510 may take the form as a lever, with a grip portion 512 at one end and a pivot point at the other end, where the pivot end of the handle 510 includes a bar or pin 514. The grip portion 512 is connected to the pin 514 by at least one lever arm, in this case two lever arms 516. As best seen in FIG. 17, the release handle latch 530 may be a spring connector with wings 532, 534. The wings 532, 534 are configured to overlay the lever arms 516 and to thereby hold the manual release handle 510 in an engaged or locked position as shown in FIG. 15. The end 228 of the piston 224 can be characterized as generally cylindrical, and provides a bayonet style connector for the handle. In particular, the end 228 includes one or more L-shaped slots 229 for receiving the pin 514. The slots 229 include an entry portion 231 that is aligned generally along the lateral axis 10 and a retention portion 233 that is generally transverse to the entry portion 231, and may include an upturned end to enhance retention of the pin 514. To remove the manual release handle 510 (to decouple bumper 300 from the piston 224 and allow the bumpers 200, 300 to the moved along the lateral axis 10 by hand), one can grab the grip portion 512 and pull away from the bumper 300, causing the manual release handle 510 to pivot about the pin 514. The manual release handle can be twisted in a counter-clockwise direction (or, in another embodiment with the L-shaped slot mirrored, clockwise) to move the pin from the retention portion 233 into alignment with the entry portion 231. The manual release handle 510 can then be pulled outward from the bumper 300, whereby the pin 514 will be withdrawn from the slot 229. The reverse steps are followed to re-couple the bumper 300 with the piston 224. Notably, the lever arms 516 include a projection 518 on their underside, where the projection serves as the pivot point for the handle 510. This configuration creates an over-center type lock, because the pin 514 is positioned between the projection 518 and the grip portion 512. In particular, when the piston 224 pulls on pin 514, it urges the grip portion 512 end of the handle 510 further into engagement with the release handle latch 530.

The controller assembly 700 includes a printed circuit board 710 and a controller 720. Collectively, the controller assembly 700 provides a system by which securement of a wheeled mobility device may be automated. The controller assembly 700 collectively may provide a computing device 730 that can perform some or all of the processes described above and below. The computing device 730 may include a processor 750, storage 752, an input/output (I/O) interface 754, and a communications bus 756. The bus 756 connects to and enables communication between the processor 750 and the components of the computing device 730 in accordance with known techniques. Note that in some computing devices there may be multiple processors incorporated therein, and in some systems there may be multiple computing devices.

The processor 750 communicates with storage 752 via the bus 756. Storage 752 may include memory, such as Random Access Memory (RAM), Read Only Memory (ROM), flash memory, etc., which is directly accessible. Storage may also include a secondary storage device, such as a hard disk or disks (which may be internal or external), which is accessible with additional interface hardware and software as is known and customary in the art. Note that a computing device 730 may have multiple memories (e.g., RAM and ROM), multiple secondary storage devices, and multiple removable storage devices (e.g., USB drive and optical drive).

The computing device 730 may also communicate with other computing devices, computers, workstations, etc. or networks thereof through a communications adapter 758, such as a telephone, cable, or wireless modem, ISDN Adapter, DSL adapter, Local Area Network (LAN) adapter, USB, or other communications channel. Note that the computing device 730 may use multiple communication adapters for making the necessary communication connections (e.g., a telephone modem card and a LAN adapter). The computing device 730 may be associated with other computing devices in a LAN or WAN. All these configurations, as well as the appropriate communications hardware and software, are known in the art.

The computing device 730 provides the facility for running software, such as Operating System software and Application software. Note that such software executes tasks and may communicate with various software components on this and other computing devices. As will be understood by one of ordinary skill in the art, computer programs such as that described herein are typically distributed as part of a computer program product that has a computer useable media or medium containing or storing the program code. Such media may include a computer memory (RAM and/or ROM), a diskette, a tape, a compact disc, a DVD, an integrated circuit, a programmable logic array (PLA), a remote transmission over a communications circuit, a remote transmission over a wireless network such as a cellular network, or any other medium useable by computers with or without proper adapter interfaces The computing device 730 may be located onboard a wheeled mobility device securement system, or may be located remotely in the vehicle or elsewhere. In general, the computing device 730 may be programmed to or includes a computer program product that may be configured to: monitor or ascertain various characteristics of one or more of the vehicle, the wheeled mobility device securement system (including but not limited to the types of securement systems described herein), the wheeled mobility device, and the passenger; and control and automate the securement of the wheeled mobility device and passenger in the system 1. The computing device 110 may operate with machine language and receive relevant information, signals, data or input from one or more sensors, devices, or other external sources (e.g., proximity sensors 112, 116, 438, 440, 450, 460), to inform the securement process. The computing device may also receive additional information, signals, data or input, including from the storage 752 and/or one or more communications adapter 758, the vehicle 30, user panels 760, and motors/linear drives 220, 404. The computing device 730 may then determine appropriate actions and initiate them via designated outputs. For example, the computing device 730 may issue instructions, in the form of signals, to various motors/linear drives 220, 404 for the securement system.

The processor 750 may be configured to communicate with the vehicle operator and/or the wheelchair passenger thru one or more optional interface panels 760. The panels 760 may contain command switches or buttons that produce signals, as well as indicator lights, audible alarms, and voice, with optional text or full graphic displays with touch-sensing capabilities. The panels 760 may be a wall-mounted unit, a wired or wireless remote control, or even an application running on a tablet or mobile device, such as an iPhone.

The computing device 730 may be configured communicate with the vehicle 30 (e.g., the controller, collision detection system, etc.) to send information regarding the status of the securement and safety systems, as well as to receive information concerning the status of the vehicle. For example, the computing device 730 may be configured to send signals to the vehicle 30 indicating that the wheeled mobility device is properly secured by the securement system, whereby the vehicle may be interlocked until a proper securement signal is received. The computing device 730 may be configured to receive signals from the vehicle 30 representative of the status and/or various dynamic conditions of the vehicle, including but not limited to: vehicle stopped; vehicle neutralized, in gear, out of gear, in park, powered down, etc.; vehicle brake applied; vehicle accelerator applied; steering wheel position; vehicle door status; and any other information that may be accessible from the vehicle systems.

The computing device 730 may also communicate with a central monitoring facility through the communications adapter 758, for example for diagnostic reasons and/or database and software updates, etc., or to provide updates regarding the status of the securement system (e.g., occupied, non-occupied, properly secured, and/or improperly secured). The central monitoring facility could also provide the computing device 730 with advanced scheduling information.

In general, the computing device 730 is programmed to receive signals or inputs from one or more sensors concerning the position of a moveable bumper, which may include any number of different sensors such as magnetic proximity sensors or contact switches. The computing device 730 is also programmed to receive signals or inputs concerning the pressure being applied to a wheeled mobility device by the moveable bumper. In the case of bumper being moved by an electric motor, the computing device 730 is programmed to receive signals or inputs concerning the voltage and current being provided to the motor. The computing device 730 may be programmed to control motor speed using pulse width modulation (hereinafter "PWM"). The computing device 730 may be programmed to ensure that the bumper does not provide more than a threshold amount of pressure on the wheeled mobility device. For example, in a system including an electric motor, the computing device 730 can monitor the current being provided to the motor and to open the circuit (i.e., turn the motor off) when the current exceeds a threshold amount. Moreover, the computing device 730 may be programmed to ensure that the bumper is maintaining a threshold amount of pressure on the wheeled mobility device during transit by continuously cycling the motor on (closing the circuit) with a predetermined frequency (e.g., turn motor on once every second) and monitoring current until it hits a predetermined threshold amount (after which the motor is turned off).

The above-described computing device 730 can be programmed for use with the embodiment of FIGS. 1-17. For example, after a wheeled mobility device is backed into the securement area and a "secure" button is pushed by either the vehicle operator or wheelchair passenger, a signal is sent to the computing device 730 to begin the securement process. The computing device 730 responds by activating the motor in the linear drive 220 to extend the second bumper 300 from the position shown in FIG. 1 to the position shown in FIG. 2. The computing device 730 can control the extension speed of bumper 300 to a first speed by using PWM and control the force that can be applied by the bumper 300 by monitoring and limiting the current to the motor. The computing device 730 will monitor the position of the bumpers 200, 300 during the extension process and will stop the motor of the linear drive 200 when it receives a signal from one or more sensors that are indicative of both bumpers 200, 300 being fully extended. For instance, the computing device 730 will stop the motor of the linear drive 200 when both of proximity sensors 112, 450 sense magnets 230, 331 located on the inner ends of the of the bumpers 200, 300. The computing device 730 will also monitor the current being provided to the motor of the linear drive 220, and stop the motor when the current exceeds a first threshold amount that is indicative of an obstruction blocking the path of the bumpers 200, 300. The first threshold amount is selected so as to not damage or harm any obstructions, which may be objects or persons in the vehicle.

The computing device 730 will then activate the rotation motor 404 to rotate the bumper 300 downward from the position shown in FIG. 2 to the position shown in FIG. 3. The computing device 730 can control the rotation speed of bumper 300 to a second speed by using PWM and control the force that can be applied by the bumper 300 by monitoring and limiting the current to the motor 404. The computing device 730 will monitor the rotational position of the bumper 300 during the rotation process and will stop the rotation motor 404 when it receives a signal from one or more sensors that are indicative of bumpers 300 being rotated to the down position. For instance, the computing device 730 will stop the rotation motor 404 when proximity sensor 440 senses magnet 432. The computing device 730 will also monitor the current being provided to the rotation motor 404, and stop the motor when the current exceeds a second threshold amount that is indicative of an obstruction blocking the path of the bumper 300. The second threshold amount is selected so as to not damage or harm any obstructions, which may be objects or persons in the vehicle.

The computing device 730 will then activate the motor of the linear drive 220 to retract the bumpers 200, 300 into the body assembly 100 from the position shown in FIG. 3 to the position shown in FIG. 4 (until the bumpers 200, 300 touch the sides of the wheeled mobility device). The computing device 730 can control the approach speed of bumpers 200, 300 (how fast they move toward each other) to a third speed by using PWM and control the force that can be applied by the bumpers 200, 300 by monitoring and limiting the current to the motor of the linear drive 220. The computing device 730 will monitor the current being provided to the motor of the linear drive 220, and stop the motor when the current exceeds a third threshold amount that is indicative of an obstruction blocking the path of the bumpers 200, 300 (e.g., the wheelchair). The third threshold amount is selected so as to not damage or harm any obstructions, which may be objects or persons in the vehicle. The computing device 730 will then pause to give the operator or passenger the opportunity to move any unintended obstructions that may be touching the bumpers (i.e., any items other than the wheelchair), before the vehicle operator can instruct the computing device 730 to apply the full securing force. While moving the bumpers 200, 300 to the wheelchair engage position, the computing device 730 will also monitor the lateral position of the bumpers 200, 300 during the retraction process and will stop the motor of the linear drive 220 when it receives a signal from one or more sensors that are indicative of bumpers 200, 300 being fully retracted (an error condition). For instance, the computing device 730 will stop the motor of the linear drive when proximity sensor 460 ceases to sense magnet 458 (which, as explained above, is indicative of either bumper 200 or bumper 300 being fully retracted).

The computing device 730 is programmed to cause the system 1 to apply a final securing force to the wheeled mobility device in response to: (1) a signal from a vehicle operator or passenger button; (2) a signal from the vehicle indicative of the vehicle leaving park. In particular, the computing device 730 will activate the motor of the linear drive 220 to retract the bumpers 200, 300 into the body assembly 100 until the bumpers 200, 300 apply a sufficient amount of force the sides of the wheeled mobility device. The computing device 730 can control the approach speed of bumpers 200, 300 (how fast they move toward each other) to a fourth speed by using PWM, wherein the fourth speed may be less than the third speed. The computing device can also control the force that can be applied by the bumpers 200, 300 by monitoring and limiting the current to the motor of the linear drive 220. The computing device 730 will monitor the current being provided to the motor of the linear drive 220, and stop the motor when the current exceeds a fourth threshold amount, wherein the fourth threshold amount may be greater than the third threshold amount. The fourth threshold amount is selected so as to provide sufficient restraining force to the wheeled mobility device, but to not damage the wheeled mobility device. While moving the bumpers 200, 300 to the wheelchair secure position, the computing device 730 will also monitor the lateral position of the bumpers 200, 300 during the retraction process and will stop the motor of the linear drive 220 if it receives a signal from one or more sensors that are indicative of bumpers 200, 300 being fully retracted (an error condition). For instance, the computing device 730 will stop the motor of the linear drive when proximity sensor 460 ceases to sense magnet 458 (which, as explained above, is indicative of either bumper 200 or bumper 300 being fully retracted).

The computing device 730 may also be programmed to re-secure the wheeled mobility device to account for movement of the wheeled mobility device during transit and to ensure that adequate restraint force is continuously applied to the wheeled mobility device. In particular, the computing device 730 may be programmed to periodically activate the motor of the linear drive 220 to retract the bumpers 200, 300 into the body assembly 100 until the bumpers 200, 300 apply a sufficient amount of force the sides of the wheeled mobility device. In one embodiment, the computing device 730 activates the motor for the linear drive 220 once every second. The computing device 730 can control the approach speed of bumpers 200, 300 (how fast they move toward each other) to a fifth speed by using PWM, wherein the fifth speed may be the same or less than the fourth speed. The computing device can also control the force that can be applied by the bumpers 200, 300 by monitoring and limiting the current to the motor of the linear drive 220. The computing device 730 will monitor the current being provided to the motor of the linear drive 220, and stop the motor when the current exceeds a fifth threshold amount, wherein the fifth threshold amount may be the same or greater than the fourth threshold amount. The fourth threshold amount is selected so as to provide sufficient restraining force to the wheeled mobility device, but to not damage the wheeled mobility device. While moving the bumpers 200, 300 to the wheelchair secure position, the computing device 730 will also monitor the lateral position of the bumpers 200, 300 during the retraction process and will stop the motor of the linear drive 220 if it receives a signal from one or more sensors that are indicative of bumpers 200, 300 being fully retracted (an error condition). For instance, the computing device 730 will stop the motor of the linear drive when proximity sensor 460 ceases to sense magnet 458 (which, as explained above, is indicative of either bumper 200 or bumper 300 being fully retracted).

The system 1 described herein has additional use with other restraints, one example being tie-down based systems that utilize motorized tensioners for the wheeled mobility device tie-downs. See, for example, the system disclosed in U.S. patent application Ser. No. 15/605,872, which is incorporated herein by reference. As a further example, the computing system 730 disclosed herein can be used to periodically apply power to a motorized retractor until a measured force being applied to the wheeled mobility device by the motorized retractor (e.g., the current being provided to the motor) reaches a predetermined threshold.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

In addition, for simplicity purposes, the terms arm, finger, joints, extremities, and other terms may be used herein, including in the claims, to refer to the various structures constituting the various embodiments of the wheeled mobility device securement system. To the extent that these terms connote a particular shape and configuration (e.g., that the structures resemble human appendages), the claims are not intended to be limited as such unless a specific shape or configuration is specifically called out in the claims.

The invention claimed is:

1. A securement system for a wheeled mobility device, the securement system comprising:

- a motor coupled to a restraint for securing the wheeled mobility device, the restraint being adapted to apply a force to the wheeled mobility device;
- a computing device is configured to re-secure the wheeled mobility device during transit by periodically activating the motor until the force exceeds a re-securement threshold force.

2. The securement system of claim 1, wherein the computing device is configured to secure the wheeled mobility device before transit by activating the motor until the force exceeds a securement threshold force, the re-securement threshold force being equal to or greater than the securement threshold force.

3. The securement system of claim 1, wherein the computing device is configured to re-secure the wheeled mobility device by periodically activating the motor with a predetermined frequency, the predetermined frequency being selected from the group including approximately once every three seconds to approximately four times every second.

4. The securement system of claim 1, wherein the computing device is configured to re-secure the wheeled mobility device by periodically activating the motor with a predetermined frequency, the predetermined frequency is at least approximately once every three seconds.

5. The securement system of claim 1, wherein the computing device is configured to re-secure the wheeled mobility device by periodically activating the motor with a predetermined frequency, the predetermined frequency is at least approximately once every two seconds.

6. The securement system of claim 1, wherein the computing device is configured to re-secure the wheeled mobility device by periodically activating the motor with a predetermined frequency, the predetermined frequency is at least approximately once every second.

7. The securement system of claim 1, wherein the computing device is configured to control a speed of the motor using pulse width modulation.

8. The securement system of claim 7, wherein the computing device is configured to: secure the wheeled mobility device by operating the motor at a first speed and re-secure the wheeled mobility device by operating the motor at a second speed, wherein the first speed is equal to or greater than the second speed.

9. The securement system of claim 1, wherein the computing device utilizes a measure of the current being provided to the motor as an indication of a measure of the force.

10. A securement system for a wheeled mobility device, the securement system comprising:

a motor that causes a restraint to exert a force on a wheeled mobility device;

a computing device configured to receive an input indicative of the force being applied to the wheeled mobility device and activate the motor to cause the wheeled mobility device restraint to exert an additional force on the wheeled mobility device;

the computing device being configured to confirm securement of the wheeled mobility device during transit by periodically activating the motor, wherein the motor stays activated until the input exceeds a threshold value.

11. The securement system of claim 10, wherein the wheeled mobility device restraint is a bumper.

12. The securement system of claim 10, wherein the wheeled mobility device restraint is a motorized retractor.

13. The securement system of claim 10, wherein the wheeled mobility device restraint is a retractor.

14. The securement system of claim 10, wherein the computing device is configured to confirm securement of the wheeled mobility device during transit by periodically activating the motor with a predetermined frequency, the predetermined frequency being selected from the group including approximately once every three seconds to approximately four times every second.

15. The securement system of claim 10, wherein the computing device is configured to confirm securement of the wheeled mobility device during transit by periodically activating the motor with a predetermined frequency, the predetermined frequency being at least approximately once every three seconds.

16. The securement system of claim 10, wherein the computing device is configured to confirm securement of the wheeled mobility device during transit by periodically activating the motor with a predetermined frequency, the predetermined frequency being at least approximately once every two seconds.

17. The securement system of claim 10, wherein the computing device is configured to confirm securement of the wheeled mobility device during transit by periodically activating the motor with a predetermined frequency, the predetermined frequency being at least approximately once every second.

18. A securement system for a wheeled mobility device, the securement system comprising:

an electric motor coupled to a restraint for securing the wheeled mobility device, the restraint being adapted to apply a force to the wheeled mobility device;

a computing device configured to re-secure the wheeled mobility device during transit by periodically activating the electric motor with a predetermined frequency until the force exceeds a threshold force.

19. The securement system of claim 18, wherein the restraint is a tie-down.

20. The securement system of claim 19, wherein the predetermined frequency is at least approximately once every three seconds.

* * * * *